United States Patent [19]

Teumer

[11] 4,347,521

[45] Aug. 31, 1982

[54] TILTED DEFLECTION ELECTRODE METHOD AND APPARATUS FOR LIQUID DROP PRINTING SYSTEMS

[75] Inventor: Roger G. Teumer, Fairport, N.Y.

[73] Assignee: Xerox Corporation, Stamford, Conn.

[21] Appl. No.: 203,210

[22] Filed: Nov. 3, 1980

[51] Int. Cl.³ .......... G01D 15/18
[52] U.S. Cl. .......... 346/75
[58] Field of Search .......... 346/75

[56] References Cited

U.S. PATENT DOCUMENTS

| | | | |
|---|---|---|---|
| 3,298,030 | 1/1967 | Lewis et al. | 346/140 X |
| 3,786,517 | 1/1974 | Krause | 346/75 |
| 3,813,676 | 5/1974 | Wolfe | 346/75 |
| 4,054,882 | 10/1977 | Roscitto | 346/1 |
| 4,194,210 | 3/1980 | Krause | 346/75 |

FOREIGN PATENT DOCUMENTS 2941322 4/1980 Fed. Rep. of Germany .

OTHER PUBLICATIONS

IBM—TDB, Gamblin et al., No. 10, vol. 11, pp. 1292–1293, 3/69.

IBM—TDB, Haskell et al., vol. 12, No. 11, p. 2001, 4/70.

*Primary Examiner*—G. Z. Rubinson
*Assistant Examiner*—S. D. Schreyer

[57] ABSTRACT

A liquid drop (i.e. ink jet) printing system is disclosed of the type wherein many parallel drop streams are continuously generated. Selected drops from each stream are deflected laterally to address the multiple pixels of a segment of a raster image scan line. The scan line segments addressed by each stream collectively compose a full scan line of a raster image. The drops are deflected by electrostatic fields tilted relative to the scan line to compensate for drop placement errors due to the relative motion between a target and the drop generator. The tilted fields are created in the spaces between interleaved teeth of two electrode members resembling garden rakes. The teeth are triangular, in cross-section at least partially, to tilt the fields. In addition, a drop collection gutter is positioned adjacent each tooth of one of the rake members. The gutter collects drops from adjacent streams not intended for marking a target. The drops within adjacent streams are swept in opposite directions. The alternately tilted (clockwise and counterclockwise) deflection fields and the appropriate sweep direction are selected for a given target direction of travel. The rake members move apart during start up and shut down of the drop streams.

13 Claims, 3 Drawing Figures

TILTED DEFLECTION ELECTRODE METHOD AND APPARATUS FOR LIQUID DROP PRINTING SYSTEMS

BACKGROUND

This invention relates to liquid drop printing systems of the type wherein drops from a continuous stream are electrostatically deflected to various flight paths. More specifically, this invention relates to improved method and apparatus for electrostatically deflecting charged drops in such systems.

U.S. Pat. No. 3,596,275 to Sweet describes a printing, marking, recording or imaging system of the present type. A continuous stream of drops is formed from a column of liquid emitted from a nozzle under pressure. At the point of drop formation from the columns, the drops are charged as they pass through a tunnel electrode. Downstream, an electrostatic field created between a pair of planar electrodes or plates on opposite sides of the drop stream deflect charged drops proportionally to their charge. The drops are spread out in a straight line on a stationary target at which they are directed. However, the nozzle and target usually move generally normal to the electrostatic deflection field. Consequently, the line pattern created by the deflection process is distorted by the relative movement.

Heretofore, distortion due to relative motion has been compensated for by tilting the deflection plates. Also, it is known to shift in time the charging of drops intended for certain positions within a line of drops thereby offsetting the tilt electrically. Mechanical tilting of the deflection plates presents packaging and maintenance difficulties in a multiple nozzle printing system. An exception are binary deflection systems wherein tilted deflection plates permit the spacing between nozzles to be increased thereby improving the apparent nozzle packing density. Prior to this invention, it has been unknown to tilt the deflection electrodes in a system creating a full scan line by stitching together segments of the scan line created by each nozzle. Electrical tilting of deflected drops is disadvantageous in that the drop utilization efficiency falls down. This means the printing rate is slower. In addition, special buffer memory is necessary to handle the electrical correction signals that take the tilt out of a scan line. Again, the electrical tilt correction becomes very complicated when employed in a multiple nozzle system.

SUMMARY

Accordingly, it is a main object of this invention to devise improved method and apparatus for compensating for distortions in a scan or print line of drops due to relative motion of the drop generator and target in a printing system having multiple nozzles collectively defining a straight scan line by having each nozzle construct a segment of the scan line.

Another object of this invention is to construct a simplified deflection electrode structure for printing systems of the foregoing type.

Yet another object of the invention is to alternate the mechanical tilt of the deflection electrodes from nozzle to nozzle in a multiple nozzle printing system of the foregoing type.

Still a further object is to construct multiple deflection electrodes for multiple nozzles in the foregoing type of printing system further including a gutter shared by adjacent nozzles.

These and other objects of this invention are achieved by using upper and lower deflection electrodes each having a plurality of teeth interleaved with each other. Each electrode resembles a garden rake. The teeth of the upper electrode are pointed downward and the teeth of the lower electrode are pointed upward. The sides of the teeth are electrically conductive and the spaces between the side surfaces of the teeth define the drop deflection zones. The upper electrodes are coupled to a potential of about 2000 volts, for example, and the lower teeth are coupled to ground potential. A tilt is given to the deflection zone by shaping the cross-section of the teeth as a full or truncated triangle.

The triangular cross-section of the teeth alternates the tilt for every other deflection zone between positive and negative slopes. The alternating slopes to adjacent deflection zones as well as the interleaving technique are especially important for the guttering operation. Preferably, adjacent drop streams share a common gutter.

REFERENCES

U.S. Pat. No. 3,813,676 to Bruce Wolfe and U.S. Pat. No. 4,054,882 to Paul Ruscitto both disclose tilting the deflection plates relative to a print line to correct for distortion. The distortion being corrected is that due to relative movement between a target and drop generator. These patents refer to single nozzle systems that print characters in a prescribed M×N matrix pattern of pixels. The Ruscitto patent also talks about the compensation being accomplished "by a change in the bit train from the character generator or other source." (See column 2, lines 36, 37 and 38 and column 5, lines 27 and 28.) There is no discussion in either patent as to a multiple nozzle system wherein a scan line or print line is created in segments by the collective action of all the nozzles as in this invention. An International Business Machine Company (IBM) Technical Disclosure Bulletin (TDB) of Gamblin and Marcus, Vol. 11, No. 10, pp. 1292–3 dated March 1969 also discloses a tilted deflection zone. This TDB does not add any disclosure of substance beyond that included in the above Wolfe and Ruscitto patents.

U.S. Pat. No. 4,194,210 to Konrad Krause discloses a Sweet type printing system having plural nozzles and a zig-zag deflection electrode structure. (See especially FIG. 8. FIG. 7 is an another embodiment to see.) However, the Krause patent describes a binary deflection system rather than the multiple deflection system of this invention. A binary deflection system is one in which the drops are routed between either of two flight paths: one that strikes the target and all others that intersect a gutter. A multiple deflection system as used herein is one in which the drops are routed between three or more flight paths with at least two paths leading to a pixel position on a target. The multiple nozzles 142–149 in FIG. 8 of the Krause patent are arranged in a zig-zag pattern that matches the zig-zag electrodes 150 and 151. A gutter is associated with each rising (141–144) and falling (145–148) set of nozzles. A drop from any nozzle reaches a target only if it is uncharged. All charged drops are deflected toward the gutter. Consequently, there is no controlled placement of drops on a target in the system disclosed by Krause. Rather, the zig-zag pattern for the nozzles is used to achieve a higher apparent linear packing density for the nozzles.

An IBM TDB of Haskell, Marcus and Walker, Vol. 12, No. 11, page 2001 of April 1970 speaks of a multiple ink jet printer deflecting plate assembly. The deflection plates 2 are maintained in a diagonal relationship. No printer system capable of using the deflection plates is described but merely the detail of the assembly. The thin layer of insulation, described as coating the copper layer in the plates 1, is not suited for deflection systems. The insulation collects charge that suppresses the electrostatic deflection field.

West German Patent Publication OLS No. 2,941,322 published Apr. 17, 1980 filed in the name of the Ricoh Corporation of Japan discloses a tilted deflection electrode 4'. The system is a multiple nozzle device but includes two pairs of deflection plates 3 and 3' and 4 and 4' arranged orthogonally to each other. The plates 3 and 3' are parallel and are oriented without any tilt. These plates affect deflection along an x axis. Plates 4 and 4' affect deflection along a y axis. The plates 4 and 4' are not parallel to each other but rather have plate 4' at a slight angle to the horizontal plate 4. This appears to be merely a variation of the Wolfe and Ruscitto disclosures.

THE DRAWINGS

The foregoing and other objects and features of this invention are apparent from the specification, the claims and the drawings taken alone or together in any combination. The drawings are:

DETAILED DESCRIPTION

Figure 1:
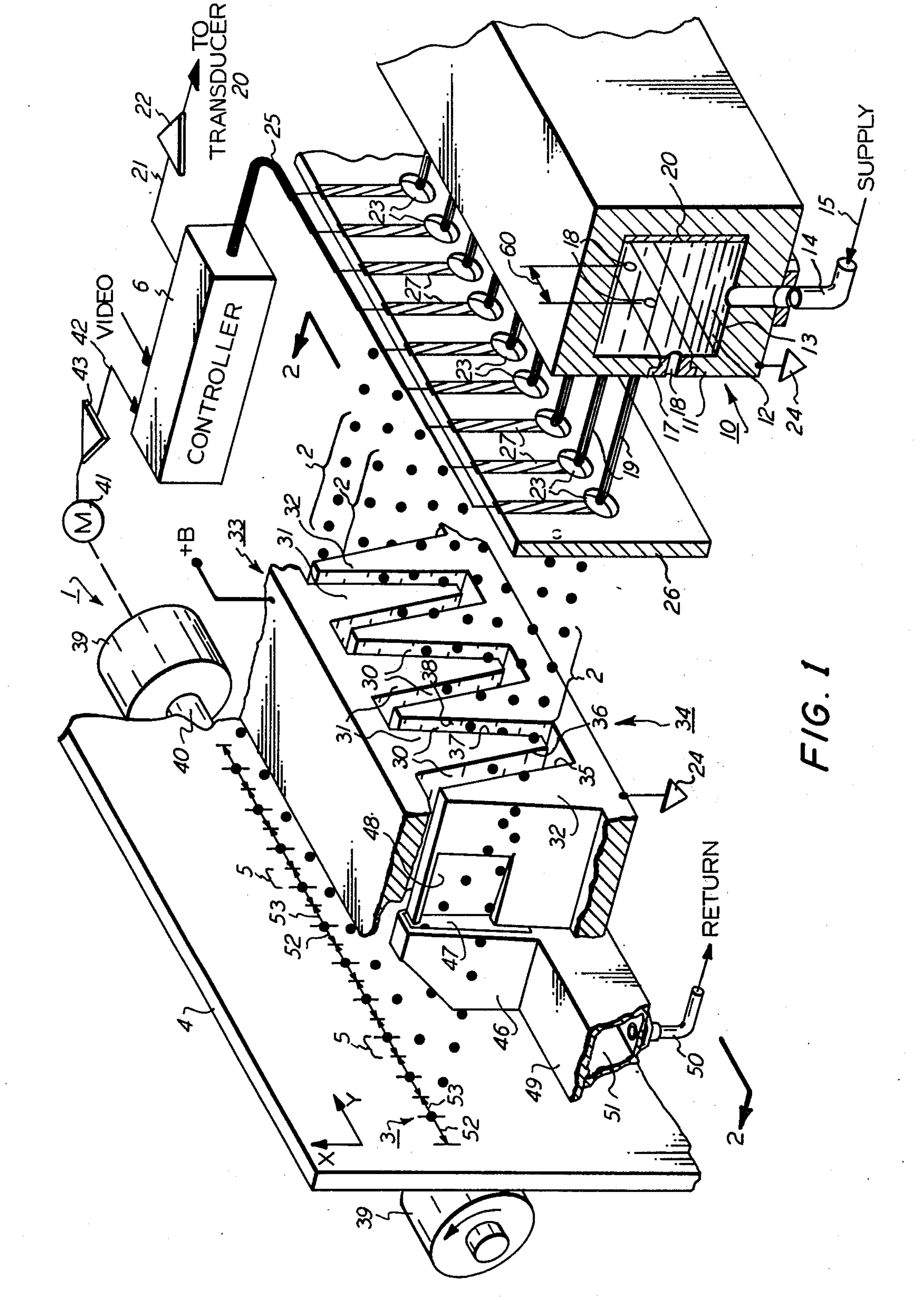
FIG. 1 is a perspective view of a printing system using alternately positive and negatively sloped tilted deflection zones according to the present invention. Gutters are positioned relative to the deflection electrodes to serve adjacent drop streams.

The printing system 1 of FIG. 1 is a Sweet type (U.S. Pat. No. 3,596,275 supra) liquid drop system. It employs many parallel drop streams 2 located generally in the same plane to construct a straight line 3 of drops across a target 4. Drops from each drop stream are electrostatically deflected laterally in the plane of the streams (generally) to construct segments 5 of line 3. A segment contains two or more drops. A segment containing a single drop is a binary deflection system of the type alluded to earlier, whereas, the present system is a multiple deflection system.

A line of drops 3 is called a print line and it overlays an imaginary line called a raster scan line composed of pixels. A pixel is representative of the reflection or transmission, optical density of an elemental area of a two dimensional image. It is ideally the same size as a liquid drop impacted on the target. A collection of parallel scan lines defines a raster scan image.

System 1 is directed to creating visible representations of a raster image stored in an electrical signal form by an appropriate controller 6. A raster image may be textual or pictorial. A textual image is one composed of discrete characters such as appearing on this page. A pictorial image is one composed of lines and curves such as graphs and charts. A pictorial image also includes an image containing continuous tone information such as a silver halide photographic print or slide as reproduced by a lithographic printing process or a television display device.

Both textual and pictorial images are reproduced by system 1 in a raster scan pattern. Multiple parallel print lines 3 are created on the target 4 by moving the target and drop streams relative to each other. A single drop is placed at a drop position within a print line if the corresponding pixel location within a scan line of an electrical raster image calls for a drop at that location. A significant aspect of this invention is that multiple drops from each drop stream form a segment of a full print line. In contrast, prior art multiple nozzle systems use the drops from each stream to create independent images. U.S. Pat. No. 3,828,354 to Howard Hilton is an example of a system in which each drop stream (see streams 16 in FIG. 1 of the patent) in an array of streams creates one or more alpha numeric characters independently of the other drop streams. In other words, the multiple streams in the Hilton patent are merely a row of independent character generators. On the other hand, the multiple streams in this invention act collectively to create an image the full width of a target. The image may be a line of characters but at least some characters in the line are constructed by two or more drop streams.

The multiple drop streams 2 are created by the drop generator 10. The generator includes a body 11 or manifold having a cavity 12 for containing a liquid ink 13 under pressure. The liquid is supplied to the cavity via an inlet conduit 14 coupled to a source of liquid under pressure as represented by arrow 15. The source is conventionally a fluid pump (not shown) pumping the liquid from a reservoir (not shown) to the manifold cavity 12. Typically, the operating liquid pressure in the cavity is from about 10 to about 100 pounds per square inch (psi).

The body 11 has an aperture plate 17 coupled to it that contains a straight row or array of nozzles 18. A nozzle is a cylindrical hole cut into the aperture plate. Of course, other cross sectional shapes are possible for the orifice. Continuous streams or columns 19 of liquid are emitted from the nozzles 18 due to the liquid pressure in the cavity 12. The drop streams 2 are generated from the columns 19 at fixed distances from the nozzles due to acoustic stimulation of the liquid in the cavity by the transducer 20. Transducer 20 is located against the wall of cavity 12 opposite the wall containing the nozzles. The layer 20 is representative of a transducer including piezoelectric material and associated electrodes that electrically operate it. The transducer varies the amplitude of the pressure in the chamber by a comparatively small amount at a frequency near the desired drop generation frequency. The stimulation of the liquid by transducer 20 promotes the formation of drops 2 at the rate of stimulation. For high speed, high quality printing, the drop generation rate is at least from about 100,000 drops per second (dps) to over 200,000 dps. Also, the drops from all the nozzles are generated at a fixed distance from the nozzles and are of uniform size and spacing. The controller 6 electrically drives the transducer 20 at the desired rate via the line 21 and amplifier 22 which couple the transducer to the controller.

The controller 6 includes a microprocessor, customary peripheral components and appropriate interface equipment for orchestrating the operations of the entire system 1. An Intel Corporation Model 8080 microcomputer and its standard support and interface modules is an example of an appropriate system. The software for the controller is dictated by the specific operation of specific systems.

The charging electrodes 23 are positioned at the region of drop formation. The liquid is electrically grounded through the manifold 11 as indicated by the ground symbol 24. The charging electrodes are conductive, cylindrical tunnels. A voltage coupled to a charging electrode over a wire in bundle 25 by the controller 6 induces a charge in the grounded liquid. During the charge induction process, the drop breaks off from a column 19 and the induced charge is trapped in the drop. The amount of trapped charge is proportional to the applied voltage. Typical charging voltages are from a few to over 200 volts. A presently preferred range is from about −130 to +130 volts. The polarity of the applied voltage affects the direction in which a drop is deflected within a constant deflection field.

The charging electrodes 23 are fabricated on an insulating board member 26. A linear array of cylindrical holes are cut into the board. The holes have a diameter of about 10 to 20 drop diameters. These holes are electroplated with copper or other conductive metal to create the cylindrical conductive tunnels 23. Thin layers of a conductive metal 27 are also created on the board 26 by conventional printed circuit board techniques to connect the tunnels 23 to a wire in the bundle 25 coupling the tunnel to controller 6.

The drops 2 are deflected by static electrostatic fields created in deflection zones 30. Zones 30 are the nearly vertical spaces between the upper teeth 31 and lower teeth 32 of the upper and lower deflection electrodes 33 and 34. Electrodes 33 and 34 are conductive members coupled to a high +B potential and ground potential 24, respectively as indicated in FIG. 1.

Hereinafter, a deflection zone is sometimes referred to as either a "left" or "right" zone. The intended orientation is that based on the lower teeth 32. That is, the deflection zones to the left and right of a lower tooth define the left and right orientation intended.

Figure 2:
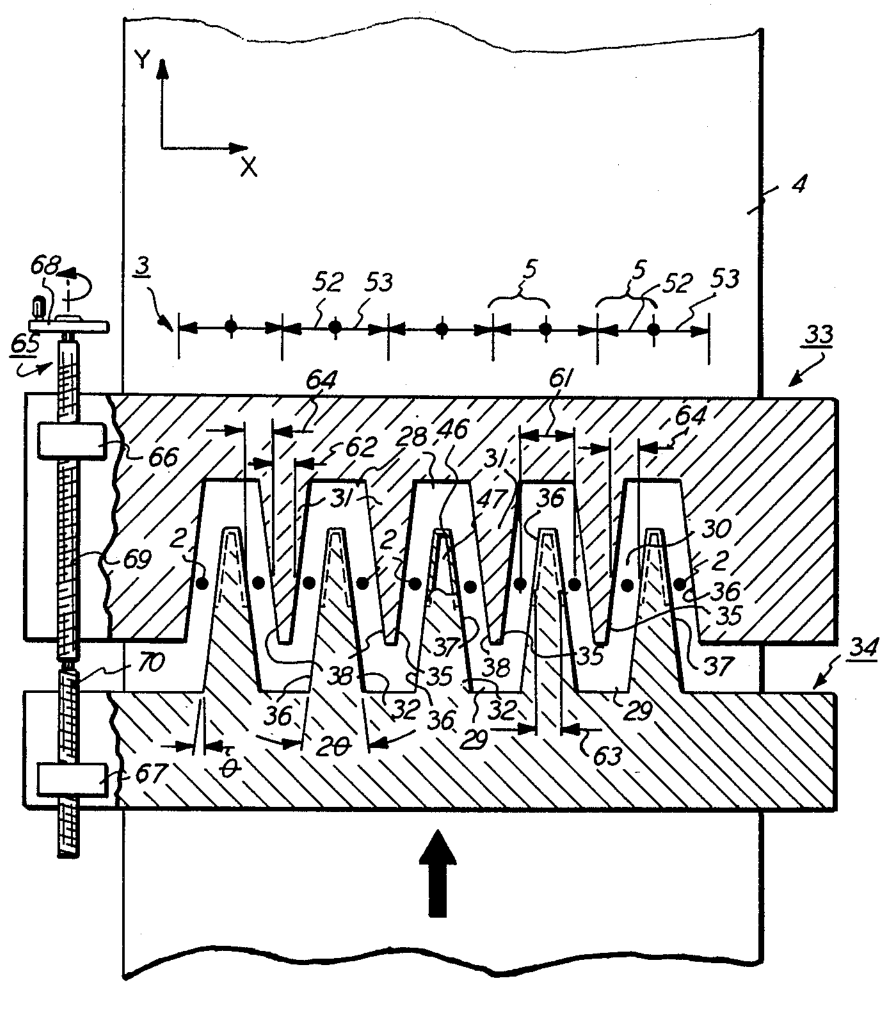
FIG. 2 is an elevation view of the system of FIG. 1 taken along lines 2—2 in FIG. 1.

Referring to FIG. 2, the upper and lower teeth 31 and 32 have truncated, triangular cross sections. The right side surface 35 of each upper tooth 31 is spaced from and generally parallel to the left side surface 36 of each lower tooth 32 thereby defining a "left" deflection zone. The left zones have a positive slope or tilt as is explained more succinctly in connection with a discussion of FIGS. 2 and 3.

Similarly, right side surface 37 of each lower tooth and a left side surface 38 of each upper tooth 32 define "right" deflection zones. The right zones have a negative slope or tilt. Again, the sign or polarity of a slope is defined more fully in connection with FIGS. 2 and 3.

The upper teeth point downwardly into the spaces 28 between the lower teeth at their midpoint. The lower teeth point upwardly into the spaces 29 between the upper teeth at their midpoints. The cross sections of the upper and lower teeth are parts of geometrically similar triangles. Consequently, the side surfaces 35 and 36, are parallel and the sides 37 and 38 are parallel. The angle $\theta$ (FIG. 2) of the triangular cross-sections of the teeth determines the slope or tilt of the left and right deflection zones. Clearly, every other deflection zone has a slope of opposite polarity.

The tilt or slope of a left or right deflection zone compensates for the relative motion between the target 4 and the drop stream. In the system of FIG. 1, the target is driven upwardly past the stationary drop generator 10 in a direction normal to the row or array of nozzles 18. A target transport is provided by the wheels 39 coupled to a common shaft 40. The shaft 40 is rotated by the motor 41. Once again, the controller 6 regulates the operation of motor 41 over an appropriate line 42 and amplifier 43. The wheels frictionally engage the back surface of the target 4 to drive the target upwardly in FIG. 1. The target is driven by the wheels at a speed to displace the target vertically by an amount separating scan lines in the raster image.

Not all the drops within the streams 2 go to the target. Gutters 46 are located adjacent each lower tooth 32 of the lower deflection electrode 34. Each gutter serves the two adjacent drop streams. The drops not intended for the print line 3 on the target are deflected into a gutter. Each gutter is triangular shaped similar to that of the lower teeth and each is positioned close to the downstream end of a tooth. The gutter position is chosen not to interfere with the flight of drops intended for all the pixels within a segment of a scan line.

Of course, the end pixels in each segment 5 are one pixel away from end pixels in adjacent segments addressed by adjacent nozzles. This is necessary for the nozzles 18 to collectively create a continuous scan line the width of target 4. The alignment of the drops to the pixel positions as described requires careful calibration of drop charging. The processes of aligning drops in one segment to those in adjacent segments is referred to as "stitching." The reader is referred to U.S. Pat. Des. No. (77295) to W. Thomas Warren describing the stitching process and means for carrying it out. (Presently U.S. Ser. No. 016,256 U.S. Pat. No. 4,238,804 filed Feb. 28, 1979 awaiting publication after payment of the final fee on or about July 2, 1980.) *The disclosure of that patent is hereby expressly incorporated herein by reference.*

Gutters 46 have openings or mouths 47 that are wide enough to receive drops from the streams in flight in both left and right deflection zones on either side of a lower tooth. Notches 48 are cut out from the side surfaces 36 and 37 of each lower tooth to increase the clearance between the side surfaces of the lower teeth and the gutters. The notches allow drops to fly into the mouths 47. A notch is wedge-shaped with the apex at a surface 36 or 37 and the base adjacent a gutter mouth 47. The notches 48 are located at elevations on the teeth 32 to provide a flight path for drops deflected by the fields into the mouth 47 of a gutter. (See FIGS. 1 and 2).

The gutters are hood-like and serve as conduits for the collected liquid. The gutters have interior cavities that allow the liquid from collected drops to flow into the cavity 51 of gutter manifold 49. A vacuum, i.e. a pressure below atmospheric, is coupled to the manifold 49 via an appropriate conduit 50. The vacuum conduit 50 returns the liquid to the system reservoir (not shown) for recirculation to the drop generator 10.

The triangular cross-sectional shape of the teeth, for example lower teeth 32, is suited for locating a gutter 46 near the downstream end of a tooth. For one, the triangular shape gives a thickness to the deflection electrodes that can accommodate gutters having a meaningful width. Also, the lower teeth are preferred over the upper teeth for the location of the gutters 46. The reason is that the lower tooth location enables the gutters to make use of gravity for the desired flow for the collected liquid. Of course, this advantage for the lower teeth is lost if the printer orientation is rotated ninety degrees. Nonetheless, it is still preferred to locate the gutters 46 adjacent the teeth that are coupled to the same potential as the liquid: ground potential in the example of FIG. 1.

The left pointing 52 and right pointing 53 arrows in FIGS. 1 and 2 represent the sweep directions of the drop streams in the left and right deflection zones. Both sweep directions 52 and 53 are outward rather than inward relative to the gutters 46. By outward is meant that the sequence in which drops are charged proceeds in a manner such that a trace of drops grows outwardly from the gutter. Conversely, an inward sweep is one in which the charging sequence begins with the drop to be placed farthest from a gutter and proceeds inwardly toward the gutter.

The sweep direction for the left and right sensing zones are both outward to correct for placement errors caused by the motion of the target in a particular direction. If the target direction of travel is reversed, the sweep direction must be reversed. This assumes that the direction of the deflection fields and the polarities of the charge on the drops remains the same.

The sweep directions 52 and 53 are opposite to each other because the same charge polarities are applied to drops in all the drop streams and because the direction of the deflection fields are opposite in every other deflection zone. The opposite field directions is a result of a grounded lower tooth 32 having two +B biased, upper teeth 31 on either side of it.

The print line 3 in FIG. 2 is one formed at an earlier time when a line on moving target 4 was at the region opposite the array of drop streams 2. The drawing of FIG. 2 is unduly cluttered when a print line 3 is drawn along the position occupied by the drop stream 2. Accordingly, that line was omitted in preference for the line shown.

Figure 3:
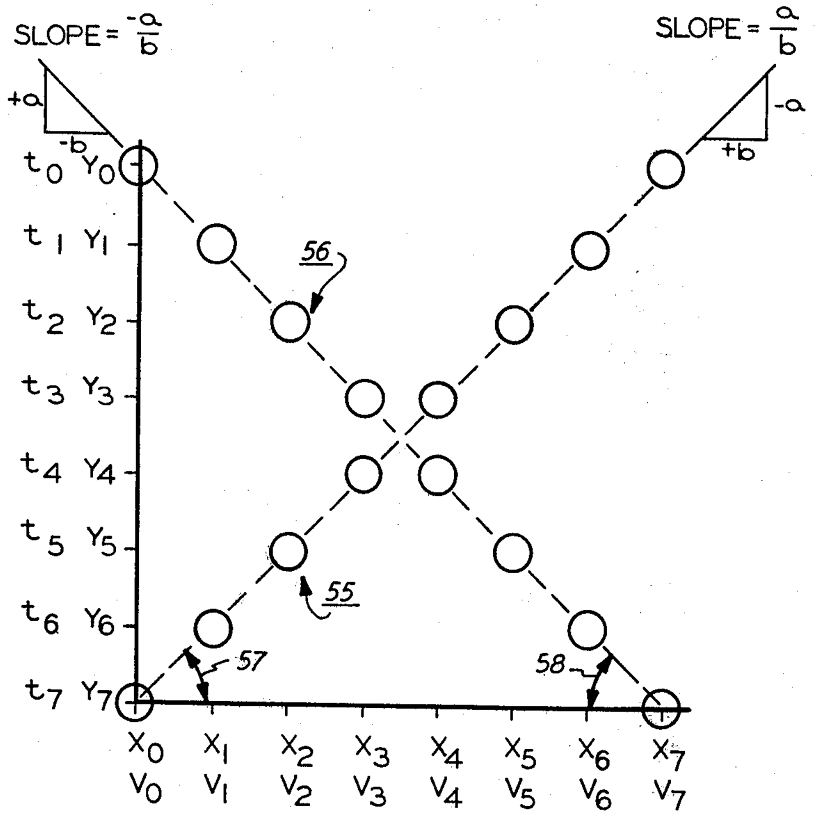
FIG. 3 is a graph of liquid drop positions along x and y axes as deposited on a target moving in the y direction relative to the nozzle from which the drops originate. The deflection plates affecting the displacement of drops along the X axis are assumed to be vertical, i.e. not tilted.

The tilt of the left deflection zone (teeth sides 35 and 36) and of the right deflection zone (teeth sides 37 and 38) are opposite to each other. The different tilts correct or compensate for the relative motion error associated with adjacent streams being swept in opposite directions as indicated by arrows 52 and 53. The graph in FIG. 3 includes plots of liquid drops on a moving target 4 for both a leftward 52 and rightward 53 scan or sweep. The deflection field deflecting the drops is not tilted. That is, surfaces 35–38 are vertical for the purposes of FIG. 3. The plot or row of drops 55 is the trace made by sweeping eight consecutive drops in a single stream 2 from right to left—for a given target direction of travel—as represented by arrow 52 in FIGS. 1 and 2. Similarly, the plot or row of drops 56 is the trace made by sweeping eight consecutive drops in a stream 2 from left to right—for a given target direction of travel—as represented by arrow 53 in FIGS. 1 and 2. In both plots, the relative velocity of the target 4 to the nozzles 18 is the same. If the direction of relative travel is reversed, the slopes of traces 55 and 56 are reversed. Similarly, the slopes of plots 55 and 56 can be reversed by charging the drops in the opposite sequence even though the direction of target travel is unchanged. The 45 degree angles 57 and 58 for plots 55 and 56 are chosen for convenience. Angles 57 and 58 correspond to angle $\theta$ in FIG. 2. The actual tilt from horizontal in high speed printing systems ranges from about 2 degrees to about 12 degrees for plots 55 and 56. The slope of plot 55 is positive as defined by the ratio of a/b as shown in FIG. 3. The slope of plot 56 is negative as defined by the ratio of −a/b as shown in FIG. 3.

The slope $\theta$ of the side surfaces 35 and 36 of the teeth defining a left deflection zone is selected to compensate for motion error associated with a leftward sweep 52 of a drop stream. The object, of course, is to have eight consecutive drops, in this example, traced as a horizontal line or sweep on the target. Consequently, the surfaces 35 and 36 (FIG. 2) are tilted clockwise from vertical by a angle $\theta$ equal to angle 57. Likewise, the surfaces 37 and 38 defining the right deflection zones (FIG. 2) are tilted counterclockwise from vertical by an angle $\theta$ equal to angle 58. This angle $\theta$ compensates for motion error associated for a rightward sweep 53 of a drop stream.

A segment 5 of a scan or print line 3 is created by a single drop stream using a linear charging scheme as illustrated by FIG. 3. In the example of FIG. 3, a line segment 5 is made up of eight pixel or drop positions represented by $X_0$ through $X_7$. Charging voltages applied to a charging electrode 23 enable the eight pixels within a segment to be addressed by a drop from a stream 2. That is, voltage $V_0$ applied to the charging electrode at a moment just prior to and during drop separation from a continuous stream 19 charges or "addresses" that drop to a level such that the field in a deflection zone positions it to pixel location $X_0$. Similarly, voltages $V_1$ through $V_7$ applied to a charging electrode at the moment of drop separation addresses drops respectively to corresponding pixel positions $X_1$ through $X_7$. The drops are not offset from the horizontal segment 5 as indicated by plots 55 and 56 in FIG. 3 because the deflection zone is appropriately tilted and the sweep direction, i.e. either inward or outward of a gutter, is appropriately selected to compensate for the relative motion error.

The presently preferred charged scheme for system 1 is a bipolar scheme. This means that the voltages $V_0$ through $V_7$ in FIG. 3 range from some negative value to some positive value, for example from −130 volts to +130 volts. A zero volt level causes a drop to strike the target following a non-deflected flight path but that particular charge level may not be used because it does not place a drop at one of the pixels within a line segment. The positive and negative polarities enable drops to be deflected left and right from a non-deflected flight path.

In the embodiment of FIGS. 1 and 2, the upper and lower teeth are coupled to +B and ground potentials respectively. Drops in left deflection zones (between surfaces 35 and 36) are deflected outwardly from a gutter 46 by linearly increasing the voltage applied to a charging electrode 23 from −130 volts (the $X_0$ position in FIG. 3) to +130 volts (the $X_7$ position in FIG. 3). Drops in right deflection zones (between surfaces 37 and 38) are also deflected outwardly by linearly increasing the voltage applied to a charging electrode 23 from −130 volts to +130 volts. A charging voltage less than +130 volts is used to gutter a drop in both the left and right deflection zones.

Classically, there are additional error sources affecting the misalignment of a drop onto an ideal pixel position $X_0$–$X_7$ within a scan line segment. The additional error sources include: induction error; electrostatic error; and aerodynamic error. These errors are corrected or minimized by techniques that do not change the tilt scheme disclosed herein. However, the magnitude of the tilt of a deflection zone relative to a print line is affected by the drop interlacing scheme used to compensate for errors. The tilt angle is increased when interlacing is used. Interlacing involves constructing a line segment 5 during two or more sweeps of a drop stream. For example, in a three sweep interlace scheme, the eight pixels of segment 5 in FIG. 3 are addressed as follows: $X_0$, $X_3$ and $X_6$ are addressed during the first sweep involving eight clock periods; $X_1$, $X_4$ and $X_7$ are addressed during the second sweep; and $X_2$ and $X_5$ are addressed during the third sweep. To compensate for motion error, the deflection field is tilted an angle three times the angle needed if all eight pixels were addressed during one sweep at the same clock or sweep rate. For a discussion of the above three error sources and means for compensating or suppressing them, including interlacing, the reader is referred to the above identified Hilton U.S. Pat. No. 3,828,354.

The dimensions involved with system 1 of FIG. 1 for a good quality printing system are important. The target 4 is conventionally 8.5×11 inch plain paper or a near size such as an A4 European paper size. For an image resolution of about 300 drops or pixels per inch, a scan line 3 contains 2550 pixels. This sets the maximum pixel dimension to about 0.00333 inch or 3.33 mils. The pixel dimension is selected to equal that of a drop after impact on a target. A drop expands by about twice its inflight size upon impact with the target. The presently preferred approach for a multiple deflection system is to employ scan line segments 5 having about 26 pixel positions. This means that about one hundred nozzles 18 are able to supply the roughly 2600 drops to a target to make a solid print line.

The above example sets the nozzle to nozzle spacing 60 (FIG. 1) to about 85 mils. The drop stream to drop stream spacing 61 (see FIG. 2) is the same as that of the nozzle spacing. The widths 62 and 63 (FIG. 2) of both the upper and lower teeth 31 and 32 are the same at least at the elevation in which drop deflection occurs. The width 64 of the deflection zones 30 at least at the deflection elevations are all the same. The sum of a zone width 64 and of a tooth width (either width 62 or 63) is equal to the drop stream to drop stream spacing 61. The deflection zone width 64 is less than a segment 5 because the drops fan outwardly to the ends of a segment due to the electrostatic deflection exerted on the drops during their flight through the deflection zone. The deflection zone need be only about ten drop diameters wide.

The interleaving of the upper and lower teeth 31 and 32 is well suited for fabrication of deflection electrodes of the above dimensions. In addition, the deflection electrodes 33 and 34 are readily separated during start up and shut down of the drop streams. During those times it is possible for liquid to electrically short the deflection plates represented by side surfaces 35–38. Moving the upper and lower electrodes away from each other, up and down in the example here, removes the surfaces 35–38 from the vicinity of streams 2. A double threaded shaft 65 journaled to the upper and lower electrodes 33 and 34 by bushings 66 and 67 is an appropriate device for moving the interleaved teeth from the operative position shown to a non-operative position. A handle 68 is turned clockwise to separate the upper and lower teeth. The threads in the region 69 are wound oppositely to those in region 70.

A similar threaded shaft (not shown) coupled in like fashion to the charging electrode board 26 offers similar advantages. In this case, the board 26 is severed along a line 71 running through the centers of the charging tunnels 23. The two halves of board 26 above and below line 71 are separated during start up and shut down of the drop streams 2.

Various modifications to the described embodiments are apparent to those of ordinary skill in the art. For example, the liquid from which the drops are formed can be coupled to some potential other than ground. Also, the teeth 31 and 32 need not be sloped from vertical and the motion error can be corrected by shifting the timing of the selection of drops for charging drops to levels corresponding to a pixel address within a segment of a scan or print line. Also, the dimensions given in the embodiments can be scaled up or down. The number of nozzles 18 can be selected to be less than the width of the target and the nozzles can be moved relative to the target along the x axis as well as the y axis. Another modification is wherein the upper and lower members 33 and 34 are made from an electrically insulating material such as a polymer having good mechanical strength. In this case, a conductive material is placed on the teeth surfaces 35–38 so that the electrostatic deflection fields can be created. Appropriate means for coupling these surfaces 35–38 to the +B and ground potentials (or other selected potentials) is required. Finally, the upper and lower vertical and horizontal orientations referred to throughout the specification is in no way intended to be limiting. Other orientations are totally permissible. The effects of gravity on liquid ink jet systems of the present type are negligible. These and similar modifications are intended to be within the scope of this invention.

I claim:

1. Liquid drop apparatus for printing with drops on a target in alignment with the pixels of a linear scan line of a raster image comprising:

drop generating means for generating a plurality of drop streams in flight toward a target moving with respect to said generating means including a linear array of nozzles for emitting liquid under pressure to create liquid columns from which the drops are formed, the nozzle spacing within the array being a distance enabling drops from a single nozzle to address multiple pixels within a segment of a raster image scan line at the target, drop deflecting means for deflecting charged drops having a first electrode which defines a series of teeth-like extensions which form angled surfaces and a second electrode which defines a second series of teeth-like extensions which interleave with said first set to create an electrostatic field between said angled surfaces which intercepts the flight path of each stream for deflecting drops from a single nozzle to address multiple pixels within a scan line segment when said first and second electrodes are coupled to an energizing potential, drop charging means for charging drops to enable the deflecting means to deflect drops to the multiple pixel addresses within a segment of a scan line at a target, and controller means for coupling charging voltages to the drop charging means in a sequence compatible with the angle of the electrode surfaces for creation of a linear row of drops in alignment with a scan line of a raster pattern.

2. The apparatus of claim 1 further including means for moving the upper and lower members between a closed position at which charged drops are deflected to address pixels within a scan line and an open position at which the upper and lower teeth are moved away from each other from the closed position a distance suited for start up and shut down of drop streams.

3. The apparatus of claim 1 wherein the upper and lower teeth include triangular cross sections with the apexes of the upper teeth pointing downward into the spaces between the lower teeth and the apexes of the lower teeth pointing upward into the spaces between the upper teeth.

4. The apparatus of claim 3 wherein the address means applies control signals to every other nozzle in an opposite sequence to be compatible with every other electrode pair being angled alternately clockwise and counterclockwise.

5. Liquid drop apparatus for printing with drops on a target in alignment with the pixels of a linear scan line of a raster image comprising:

drop generating means for generating a plurality of drop streams in flight toward a target including a linear array of nozzles for emitting liquid under pressure to create liquid columns from which the drops are formed, the nozzle spacing within the array being a distance enableing drops from a single nozzle to address multiple pixels within a segment of a raster image scan line at a target, drop deflecting means for deflecting charged drops including upper and lower electrodes coupled to first and second voltage and having, respectively, upper teeth pointing downward into the spaces between lower teeth and lower teeth pointing upward into the spaces between upper teeth with the space between side surfaces from adjacent upper and lower teeth defining electrostatic deflection zones in the flight path of a drop stream having opposite field directions, drop charging means for charging drops to enable a deflection zone to deflect drops within a stream to the multiple pixel addresses within a segment of a scan line at a target, and drop gutter means for collecting drops not intended to strike a target including a mouth for receiving drops positioned on both sides of selected ones of said upper and lower electrodes such that each drop stream is bounded by a gutter.

6. The apparatus of claim 5 further including controller means for coupling charging voltages to the drop charging means in a sequence compatible with sweep directions of adjacent drop streams.

7. The apparatus of claim 5 wherein said teeth of the upper and lower electrodes have sloped surfaces for creating tilted deflection zones to compensate for drop placement errors relative to the pixels of a scan line segment due to relative motion between a target and a nozzle.

8. The apparatus of claim 7 wherein the cross-sectional shape of the upper and lower teeth is at least partially triangular to create tilted deflection zones that have alternately positive and negative slopes for adjacent drop streams.

9. The apparatus of claim 8 wherein the gutter means have cross-sectional shapes similar to that of the teeth.

10. The apparatus of claim 6 wherein the control means includes means for shifting the order for charging drops to change the addressing of drops in a manner to compensate for drop position errors relative to addressed pixels within a scan line segment due to relative motion between a target and a nozzle.

11. The apparatus of claim 5 wherein the array of nozzles extends substantially the width of a target and further including drive means for moving a target normal to a stationary array of nozzles.

12. Liquid drop method for printing with drops on a target in alignment with the pixels of a linear scan line of a raster image comprising:

generating a plurality of drop streams in flight toward a target spaced apart from each other by a distance enabling drops from each stream to address multiple pixels within a segment of a raster image scan line at the target, deflecting drops from such streams with tilted electrostatic deflection fields created in the path of said streams, the tilt between adjacent fields being alternated to compensate for drop position errors relative to the pixels with a scan line segment due to relative motion between a target and a drop stream, sequentially charging drops in each of the streams to levels that enable the tilted deflection fields to deflect drops in a stream to the multiple pixels within a scan line segment, and collecting drops from each stream not intended for striking a target by positioning a gutter between two adjacent streams to enable one gutter to collect drops from said two adjacent streams.

13. The method of claim 12 further including controlling the sequence in which drops are charged for sweeping the drops from adjacent streams in a direction compatible with the tilt of the deflection fields and the direction of relative motion between the plurality of drop streams and a target.

* * * * *